US009109942B2

(12) United States Patent
Gabibulayev (10) Patent No.: US 9,109,942 B2
(45) Date of Patent: Aug. 18, 2015

(54) METHOD OF CALCULATING PAYLOAD MATERIAL WEIGHT AND MACHINE USING SAME

(71) Applicant: Caterpillar Inc., Peoria, IL (US)

(72) Inventor: Magomed Gabibulayev, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 172 days.

(21) Appl. No.: 13/862,558

(22) Filed: Apr. 15, 2013

(65) Prior Publication Data

US 2014/0309850 A1     Oct. 16, 2014

(51) Int. Cl.
 *G01G 19/08* (2006.01)
 *G01G 19/12* (2006.01)

(52) U.S. Cl.
 CPC ............. *G01G 19/08* (2013.01); *G01G 19/086* (2013.01); *G01G 19/12* (2013.01)

(58) Field of Classification Search
 CPC ..... G01G 19/08; G01G 19/086; G01G 19/10; G01G 19/12
 USPC ............ 701/50; 702/101, 102, 129, 173, 174, 702/175
 See application file for complete search history.

(56) References Cited

U.S. PATENT DOCUMENTS

| | | | |
|---|---|---|---|
| 4,588,038 A | | 5/1986 | Takagi |
| 4,635,739 A * | | 1/1987 | Foley et al. ................. 177/45 |
| 4,809,794 A * | | 3/1989 | Blair et al. ................. 177/139 |
| 5,182,712 A * | | 1/1993 | Kyrtsos et al. .................. 701/50 |
| 5,677,498 A * | | 10/1997 | Oakes et al. ............. 73/862.541 |
| 5,814,771 A | | 9/1998 | Oakes et al. |
| 5,877,455 A * | | 3/1999 | Kyrtsos ............................. 177/1 |
| 6,858,809 B2 | | 2/2005 | Bender |
| 2002/0111767 A1* | | 8/2002 | Lueschow et al. ............ 702/175 |
| 2004/0102907 A1* | | 5/2004 | Lueschow et al. .............. 702/33 |
| 2004/0104596 A1* | | 6/2004 | Bender ....................... 296/183.2 |
| 2009/0187527 A1* | | 7/2009 | Mcaree et al. ................... 706/52 |
| 2010/0161185 A1* | | 6/2010 | Marathe et al. ................ 701/50 |
| 2010/0211356 A1 | | 8/2010 | Minoshima et al. |

FOREIGN PATENT DOCUMENTS

WO     WO 2012106826 A1 *   8/2012

* cited by examiner

*Primary Examiner* — Thomas G Black
*Assistant Examiner* — Sara Nelson
(74) *Attorney, Agent, or Firm* — Liell & McNeil Attorneys, PC (57) ABSTRACT

A method of calculating payload material weight is executable by an electronic controller of a machine and includes steps of determining a first force on first front and rear struts of the machine in an unloaded condition of the machine, and adjusting the first force based on at least one of an unloaded front strut friction force and an unloaded rear strut friction force to define an unloaded weight. The method also includes steps of determining a second force on the first front and rear struts in a loaded condition of the machine, and adjusting the second force based on at least one of a loaded front strut friction force and a loaded rear strut friction force to define a loaded weight. A payload material weight is calculated by the method based on a difference between the loaded weight and the unloaded weight.

20 Claims, 4 Drawing Sheets

METHOD OF CALCULATING PAYLOAD MATERIAL WEIGHT AND MACHINE USING SAME

TECHNICAL FIELD

The present disclosure relates generally to a method of calculating payload material weight based on a difference between a loaded weight and an unloaded weight, and more particularly to independently calculating the loaded weight and the unloaded weight based on strut pressures and a plurality of tunable parameters.

BACKGROUND

Off-highway machines, such as, for example, dump trucks, are typically used to transport a payload material, such as, for example, rock, sand, dirt, or gravel, from one location to another. According to a particular work cycle, the dump truck may use a dump body to receive a portion of the payload material and transfer the received portion of payload material to another location. According to this work cycle and others, it may be desirable to calculate the weight, or mass, of the payload material that is moved within or transported from a work site. This payload weight calculation may be used to evaluate efficiency, productivity, and profitability of the work site operations.

Some onboard payload material weight calculation strategies for these types of machines include measuring suspension strut pressures of the truck and using a combination of formulas and empirical data to calculate the payload weight. For instance, co-owned U.S. Pat. No. 5,182,712 to Kyrtsos et al. teaches a dynamic payload monitor with the capability of measuring the compression condition of the four struts of the truck while the truck is in motion, in order to produce an even more accurate measurement than that likely possible when the truck is in a stationary position. These strut pressure strategies can typically produce payload weight accuracies on the order of plus or minus 5%. However, there is an ever increasing demand for improved accuracy with respect to payload weight measurement systems.

The present disclosure is directed to one or more of the problems or issues set forth above.

SUMMARY OF THE DISCLOSURE

In one aspect, a machine having a payload material weight calculation algorithm executable thereon includes a machine frame supported by a conveyance. A dump body is pivotally mounted on the machine frame and has a loaded condition in which the dump body supports a payload material and an unloaded condition in which the dump body is substantially free of the payload material. A first front strut and a first rear strut are positioned to support the dump body relative to the machine frame. An electronic controller is in communication with the first front strut and the first rear strut and is configured to determine a first force on the first front strut and the first rear strut in the unloaded condition, and adjust the first force based on at least one of an unloaded front strut friction force in the unloaded condition and an unloaded rear strut friction force in the unloaded condition to define an unloaded weight. The electronic controller is also configured to determine a second force on the first front strut and the first rear strut in the loaded condition, and adjust the second force based on at least one of a loaded front strut friction force in the loaded condition and a loaded rear strut friction force in the loaded condition to define a loaded weight. The electronic controller determines a weight of the payload material based on a difference between the loaded weight and the unloaded weight.

In another aspect, a method of calculating a payload material weight for a machine is provided. The machine includes a machine frame supported by a conveyance, and a dump body pivotally mounted on the machine frame and having a loaded condition in which the dump body supports a payload material and an unloaded condition in which the dump body is substantially free of the payload material. A first front strut and a first rear strut are positioned to support the dump body relative to the machine frame. The machine also includes an electronic controller in communication with the first front strut and the first rear strut. The method includes steps of determining a first force on the first front strut and the first rear strut in the unloaded condition using the electronic controller, and adjusting the first force based on at least one of an unloaded front strut friction force corresponding to the unloaded condition and an unloaded rear strut friction force corresponding to the unloaded condition using the electronic controller to define an unloaded weight. The method also includes steps of determining a second force on the first front strut and the first rear strut in the loaded condition using the electronic controller, and adjusting the second force based on at least one of a loaded front strut friction force corresponding to the loaded condition and a loaded rear strut friction force corresponding to the loaded condition using the electronic controller to define a loaded weight. The method also includes a step of determining a weight of the payload material based on a difference between the loaded weight and the unloaded weight.

DETAILED DESCRIPTION

Figure 1:
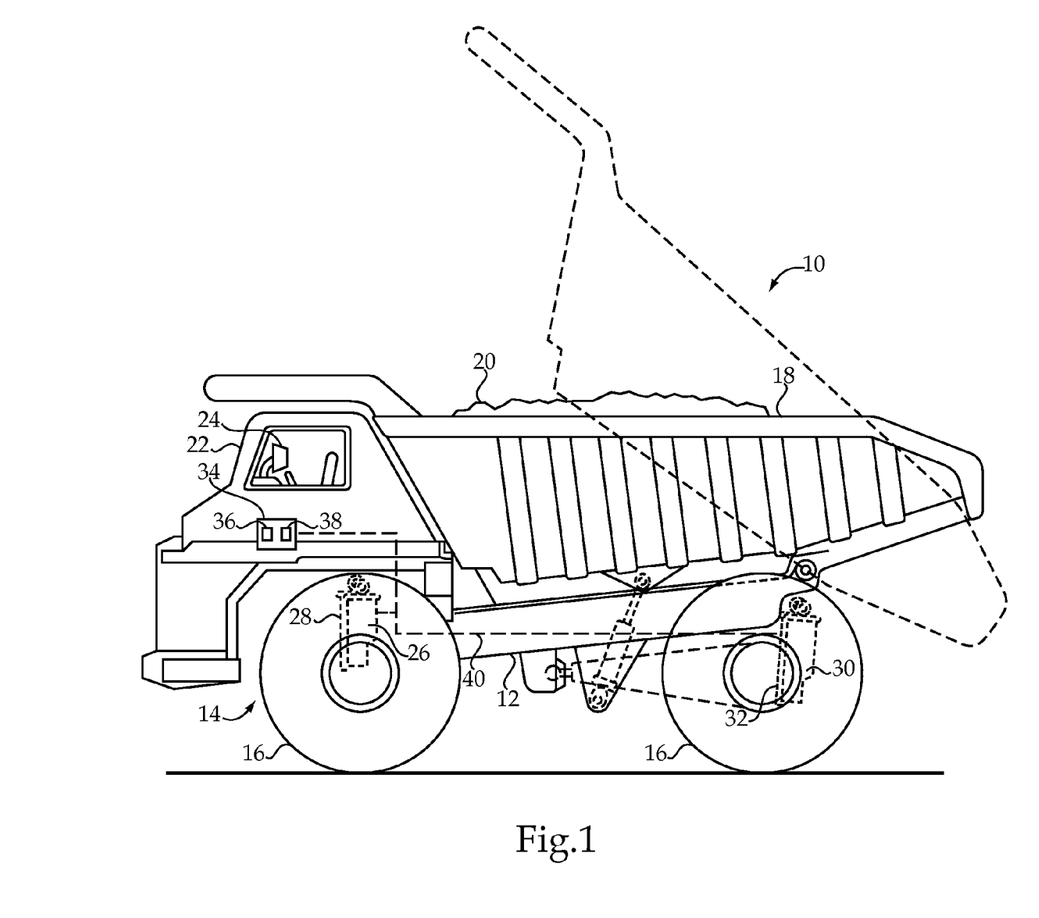
FIG. 1 is a side diagrammatic view of a machine, according to the present disclosure.

An exemplary embodiment of a machine 10 is shown generally in FIG. 1. The machine 10 may be a mining truck, as shown, or other vehicle, such as an on-highway or off-highway machine configured to carry a payload material. The exemplary machine 10, also referred to as a dump truck, generally includes a machine frame 12 supported by a conveyance 14. The conveyance 14 may include wheels 16, as shown, tracks, or other known ground engaging propulsion elements supporting the machine frame 12. A dump body 18 may be pivotally mounted on the machine frame 12 such that the dump body 18 is movable between a hauling position, as shown, and a dumping position, shown in phantom. The dump body 18 may have a loaded condition (shown) in which the dump body 18 supports a payload material 20 and an unloaded condition in which the dump body 18 is substantially free of the payload material 20.

The machine 10 may also include an operator control station 22 supported on the machine frame 12 and housing various controls and devices for controlling operation of the machine 10. The operator control station 22 may also house an operator interface 24, including an operator display, for displaying various operational information relating to the machine 10 and facilitating operator input of various control information. For example, the operator interface 24 may facilitate the calculation and display of payload material weight information. Additionally, controls may be provided in the operator control station 22 for controlling movement of the dump body 18 between the hauling and dumping positions described above.

The machine 10 also includes a pair of front struts 26 and 28 and a pair of rear struts 30 and 32, each of which supports the dump body 18 relative to the machine frame 12. Front strut 26 may be referenced herein as a first front strut or a left front strut, while front strut 28 may be referenced throughout the disclosure as a second front strut or a right front strut. Rear strut 30 may also be referred to herein as a first rear strut or a left rear strut, while rear strut 32 may be referenced herein as a second rear strut or a right rear strut. Each of the struts 26, 28, 30, and 32 may be a commonly known gas-over-liquid type strut and may be positioned and configured in a manner known to those skilled in the art.

The machine 10 also includes at least one electronic controller 34, which may be part of a machine control system, for controlling, coordinating, and evaluating various operations of the machine 10. The electronic controller 34 may be of standard design and may include a processor 36, such as, for example, a central processing unit, a memory 38, and an input/output circuit that facilitates communication internal and external to the electronic controller 34. The processor 36, for example, may control operation of the electronic controller 34 by executing operating instructions, such as, for example, computer readable program code stored in the memory 38, wherein operations may be initiated internally or externally to the electronic controller 34. Control schemes may be utilized that monitor outputs of systems or devices, such as, for example, sensors, actuators, or control units, via the input/output circuit to control inputs to various other systems or devices.

The memory 38, as used herein, may comprise temporary storage areas, such as, for example, cache, virtual memory, or random access memory, or permanent storage areas, such as, for example, read-only memory, removable drives, network/internet storage, hard drives, flash memory, memory sticks, or any other known volatile or non-volatile data storage devices. One skilled in the art will appreciate that any computer based system or device utilizing similar components for controlling the machine systems or components described herein, is suitable for use with the present disclosure.

The electronic controller 34 may communicate with various systems and components of the machine 10 via one or more wired and/or wireless communication lines 40, which may correspond to the input/output circuit. For example, the electronic controller 34 may communicate with the first and second front struts 26 and 28 and the first and second rear struts 30 and 32, or, more specifically, pressure sensors therefor, via communication lines 40. The pressure sensor readings, as will be described below, may be used by the electronic controller 34 to calculate a payload material weight. Although only one electronic controller 34 is described herein, it should be appreciated that an electronic control system for the machine 10 may include numerous electronic controllers for controlling various systems and components of the machine 10 in a known manner. For example, electronic controller 34, or an alternative electronic controller, may control movement of the dump body 18 based on an operator input.

Figure 2:
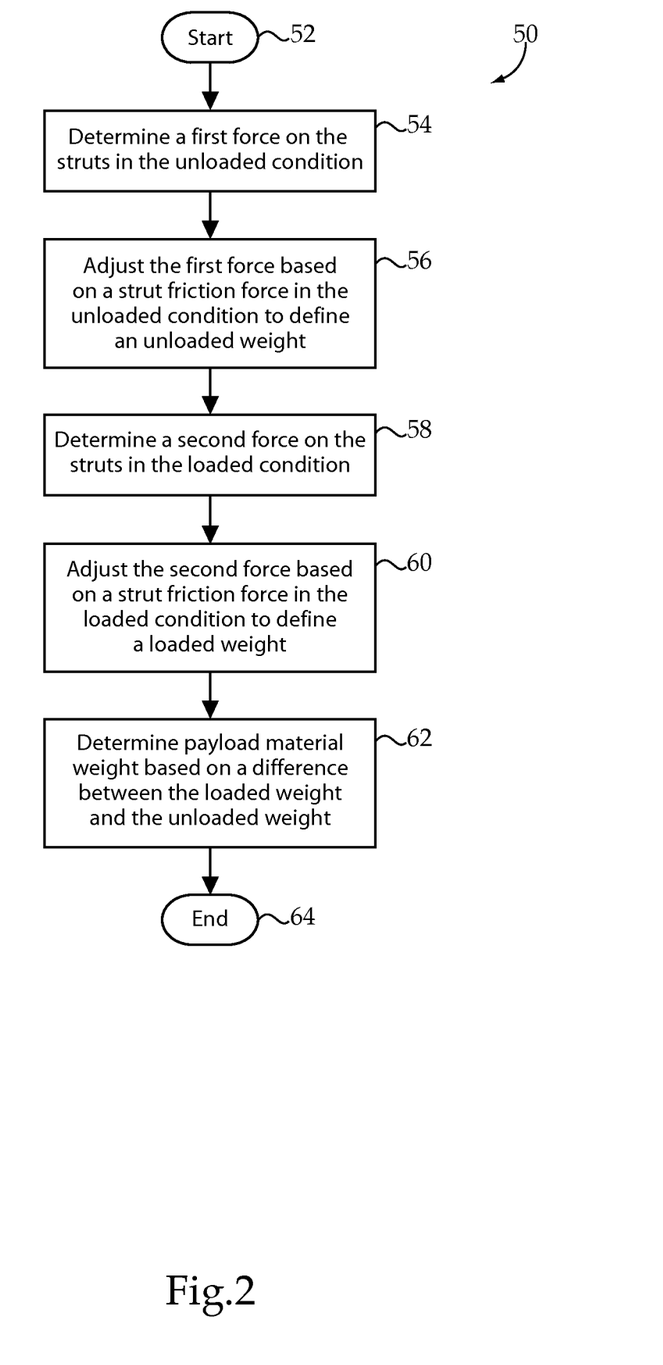
FIG. 2 is a flow chart of one embodiment of a method of calculating payload material weight for the machine of FIG. 1.

Turning now to FIG. 2, there is shown a logic flow diagram 50 representing an exemplary method of calculating a weight of the payload material 20 onboard the machine 10, according to the present disclosure. The method may be implemented by the electronic controller 34, or other similar control device, of the machine 10. According to one example, the steps implementing the disclosed method, or a portion thereof, may be in the form of computer readable program code stored in the memory 38 of the electronic controller 34 and executed by the processor 36 of the electronic controller 34, or other computer usable medium. The method may be initiated in response to one or more predetermined events, such as an operator request or indications of predetermined conditions of the machine 10, as will be described below.

The method begins at a START, Box 52. From Box 52, the method proceeds to Box 54, which includes the step of determining a first force on the first and second front struts 26 and 28 and the first and second rear struts 30 and 32 in the unloaded condition of the dump body 18. As described above, the unloaded condition of the dump body 18 may be a condition in which the dump body 18 is not loaded with the payload material 20. Although four struts 26, 28, 30, and 32 are shown, it should be appreciated that the payload material weight calculation strategy disclosed herein may be used with alternative numbers and arrangements of struts. The first force, which will be described in greater detail with reference to FIG. 3, may be adjusted based on at least one of an unloaded front strut friction force in the unloaded condition and an unloaded rear strut friction force in the unloaded condition to define an unloaded weight, at Box 56. The unloaded front strut friction force and the unloaded rear strut friction force, each of which will be described below, may represent a force of a respective one of the struts 26, 28, 30, and 32 that resists motion caused by the first force.

The method proceeds to Box 58, which includes a step of determining a second force on the first and second front struts 26 and 28 and the first and second rear struts 30 and 32 in the loaded condition of the dump body 18. As described above, the dump body 18 contains or supports the payload material 20 in the loaded condition of the dump body 18. The second force, described further below, may be adjusted, at Box 60, based on at least one of a loaded front strut friction force in the loaded condition and a loaded rear strut friction force in the loaded condition to define a loaded weight. At Box 62, a weight of the payload material 20 is calculated based on a difference between the loaded weight, determined at Box 60, and the unloaded weight, determined at Box 56. It should be appreciated that the unloaded weight may be calculated before or after the loaded weight is calculated, and may be stored in the memory 38 for later reference or use.

Figure 3:
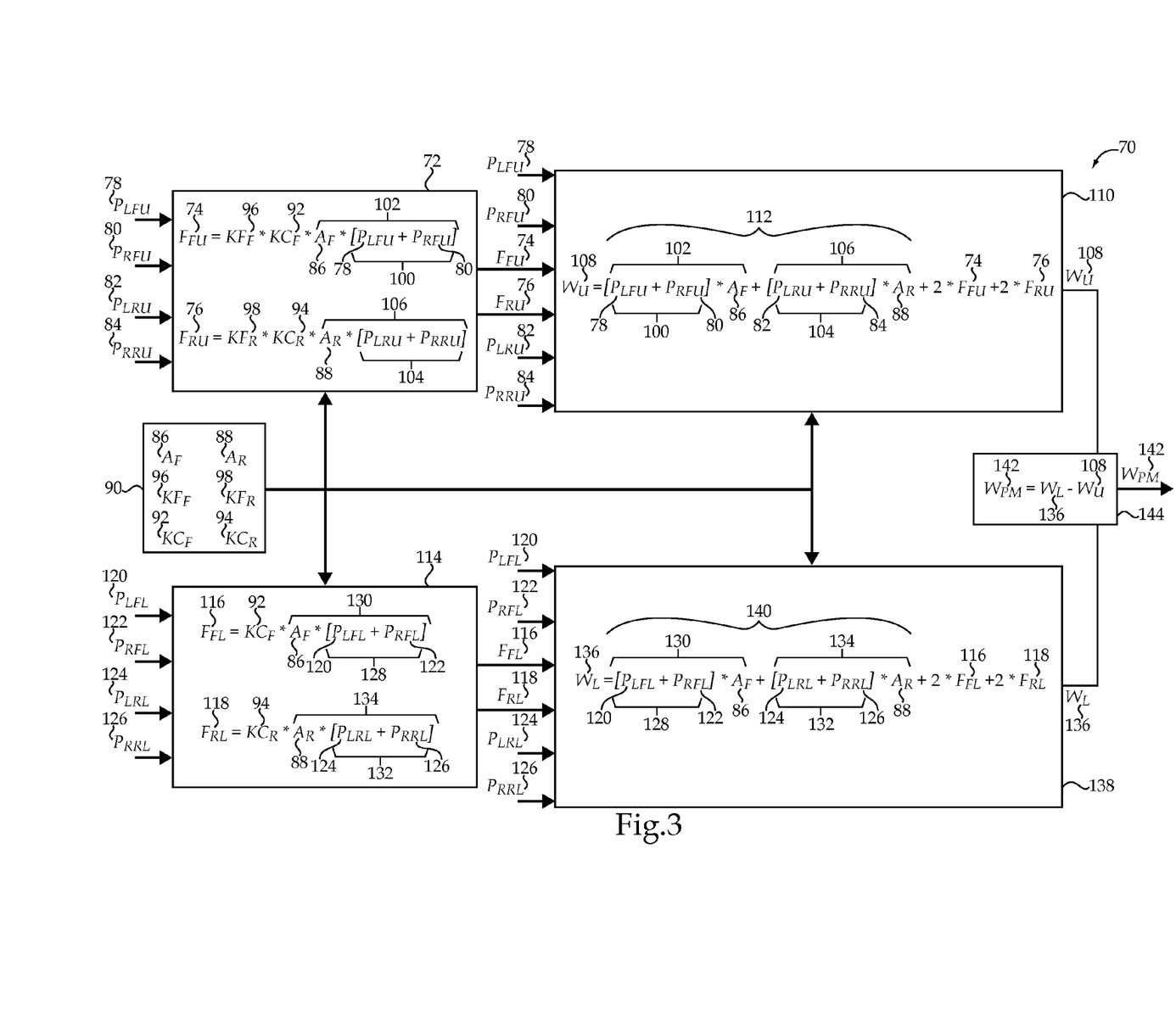
FIG. 3 is a diagrammatic illustration of an exemplary implementation of a payload material weight calculation algorithm corresponding to the method of FIG. 3.

A specific implementation of the method of FIG. 2 is shown in FIG. 3. In particular, a diagrammatic illustration of software control logic 70, corresponding to an algorithm for implementing the method of FIG. 3, is shown. At Box 72, an unloaded front strut friction force ($F_{FU}$) 74 and an unloaded rear strut friction force ($F_{RU}$) 76 are calculated. Detected pressures ($P_{LFU}$) 78, ($P_{RFU}$) 80, ($P_{LRU}$) 82, and ($P_{RRU}$) 84 corresponding to the first and second front struts 26 and 28 and the first and second rear struts 30 and 32 in the unloaded condition are received as inputs to Box 72. In particular, pressure ($P_{LFU}$) 78 may be a detected pressure of the left front strut 26, pressure ($P_{RFU}$) 80 may be a detected pressure of the right front strut 28, pressure ($P_{LRU}$) 82 may be a detected pressure of the left rear strut 30, and pressure ($P_{RRU}$) 84 may be a detected pressure of the right rear strut 32. Each of the strut pressures ($P_{LFU}$) 78, ($P_{RFU}$) 80, ($P_{LRU}$) 82, and ($P_{RRU}$) 84 may be transmitted over communication lines 40 from a respective one of the struts 26, 28, 30, and 32 to the electronic controller 34.

Also received as inputs to Box 72 are a front strut area ($A_F$) 86 of one of the first and second front struts 26 and 28 and a rear strut area ($A_R$) 88 of one of the first and second rear struts 30 and 32. According to some embodiments, each of the front struts 26 and 28 may have similar effective areas and, thus, the front strut area ($A_F$) 86 may represent the area of each of the first and second front struts 26 and 28. Similarly, the first and second rear struts 30 and 32 may have similar effective areas such that the rear strut area ($A_R$) 88 represents the area of each of the first and second rear struts 30 and 32. The front strut area ($A_F$) 86 and the rear strut area ($A_R$) 88 are shown at Box 90 and may represent values stored in memory 38. According to some embodiments, these values may be provided by a manufacturer.

Also stored in memory 38, and shown at Box 90, may be a front strut coefficient of friction ($KC_F$) 92, a rear strut coefficient of friction ($KC_R$) 94, a front strut friction factor ($KF_F$) 96, and a rear strut friction factor ($KF_R$) 98. The front strut coefficient of friction ($KC_F$) 92 may be a tunable parameter and may include a value selected to represent the friction between surfaces of one or both of the first and second front struts 26 and 28. The rear strut coefficient of friction ($KC_R$) 94 may also be a tunable parameter and may include a value selected to represent the friction between surfaces of at least one of the first and second rear struts 30 and 32. The front strut friction factor ($KF_F$) 96 and the rear strut friction factor ($KF_R$) 98 may also be tunable parameters and, according to the exemplary embodiment, may be used to calculate the unloaded front strut friction force ($F_{FU}$) 74 and the unloaded rear strut friction force ($F_{RU}$) 76. These additional values may also be provided by a manufacturer and, according to some embodiments, may vary according to particular machine configurations.

As shown at Box 72, the detected pressures ($P_{LFU}$) 78 and ($P_{RFU}$) 80 of the first and second front struts 26 and 28 in the unloaded condition may be added to define a combined unloaded front strut pressure 100. The combined unloaded front strut pressure 100 may be multiplied by the front strut area ($A_F$) 86 to define a third force 102. The third force 102 is multiplied by the front strut coefficient of friction ($KC_F$) 92 and the front strut friction factor ($KF_F$) 96 to arrive at the unloaded front strut friction force ($F_{FU}$) 74.

Similarly, the detected pressures ($P_{LRU}$) 82, and ($P_{RRU}$) 84 of the first and second rear struts 30 and 32 in the unloaded condition may be added together to define a combined unloaded rear strut pressure 104. The combined unloaded rear strut pressure 104 may be multiplied by the rear strut area ($A_R$) 88 to define a fourth force 106. The fourth force 106 is multiplied by the rear strut coefficient of friction ($KC_R$) 94 and the rear strut friction factor ($KF_R$) 98 to arrive at the unloaded rear strut friction force ($F_{RU}$) 76.

Next, an unloaded weight ($W_U$) 108 is calculated at Box 110. A first force 112 on the first and second front struts 26 and 28 and the first and second rear struts 30 and 32 in the unloaded condition of the dump body 18 may be calculated by adding the third force 102, representing the force on the first and second front struts 26 in the unloaded condition, and the fourth force 106, representing the force on the first and second rear struts 30 and 32 in the unloaded condition. The first force 112 is adjusted based on both of the unloaded front strut friction force ($F_{FU}$) 74 and the unloaded rear strut friction force ($F_{RU}$) 76. According to the exemplary embodiment, each of the unloaded front strut friction force ($F_{FU}$) 74 and the unloaded rear strut friction force ($F_{RU}$) 76 is multiplied by 2 since two front struts 26 and 28 are used and two rear struts 30 and 32 are used.

At Box 114, a loaded front strut friction force ($F_{FL}$) 116 and a loaded rear strut friction force ($F_{RL}$) 118 are calculated. Detected pressures ($P_{LFL}$) 120, ($P_{RFL}$) 122, ($P_{LRL}$) 124, and ($P_{RRL}$) 126 corresponding to the first and second front struts 26 and 28 and the first and second rear struts 30 and 32 in the loaded condition are received as inputs to Box 114. In particular, pressure ($P_{LFL}$) 120 may be a detected pressure of the left front strut 26, pressure ($P_{RFL}$) 122 may be a detected pressure of the right front strut 28, pressure ($P_{LRL}$) 124 may be a detected pressure of the left rear strut 30, and pressure ($P_{RRL}$) 126 may be a detected pressure of the right rear strut 32. Each of the strut pressures ($P_{LFL}$) 120, ($P_{RFL}$) 122, ($P_{LRL}$) 124, and ($P_{RRL}$) 126 may be transmitted over communication lines 40 from a respective one of the struts 26, 28, 30, and 32 to the electronic controller 34. Also received as inputs to Box 114 are the front strut area ($A_F$) 86, the rear strut area ($A_R$) 88, the front strut coefficient of friction ($KC_F$) 92, and the rear strut coefficient of friction ($KC_R$) 94.

As shown at Box 114, the detected pressures ($P_{LFL}$) 120 and ($P_{RFL}$) 122 of the first and second front struts 26 and 28 in the loaded condition may be added together to define a combined loaded front strut pressure 128. The combined loaded front strut pressure 128 may be multiplied by the front strut area ($A_F$) 86 to define a fifth force 130. The fifth force 130 is multiplied by the front strut coefficient of friction ($KC_F$) 92 to arrive at the loaded front strut friction force ($F_{FL}$) 116.

Similarly, the detected pressures ($P_{LRL}$) 124, and ($P_{RRL}$) 126 of the first and second rear struts 30 and 32 in the loaded condition may be added together to define a combined loaded rear strut pressure 132. The combined loaded rear strut pressure 132 may be multiplied by the rear strut area ($A_R$) 88 to define a sixth force 134. The sixth force 134 is multiplied by the rear strut coefficient of friction ($KC_R$) 94 to arrive at the loaded rear strut friction force ($F_{RL}$) 118.

Next, a loaded weight ($W_L$) 136 is calculated at Box 138. A second force 140 on the first and second front struts 26 and 28 and the first and second rear struts 30 and 32 in the loaded condition of the dump body 18 may be calculated by adding the fifth force 130, representing the force on the first and second front struts 26 in the loaded condition, and the sixth force 134, representing the force on the first and second rear struts 30 and 32 in the loaded condition. The second force 140 is adjusted based on both of the loaded front strut friction force ($F_{FL}$) 116 and the loaded rear strut friction force ($F_{RL}$) 118. According to the exemplary embodiment, each of the loaded front strut friction force ($F_{FL}$) 116 and the loaded rear strut friction force ($F_{RL}$) 118 is multiplied by 2 since two front struts 26 and 28 are used and two rear struts 30 and 32 are used.

A payload material weight ($W_{PM}$) 142 is then calculated at Box 144. As shown, the payload material weight ($W_{PM}$) 142 may be based on a difference between the loaded weight ($W_L$) 136 and the unloaded weight ($W_U$) 108. It should be appreciated that the processor 36 of the electronic controller 34 may perform the calculations corresponding to the equations disclosed herein. The electronic controller 34 may be programmed to detect, or may otherwise receive an indication of, the unloaded condition of the dump body 18 and, in response, calculate the unloaded front strut friction force ($F_{FU}$) 74 and an unloaded rear strut friction force ($F_{RU}$) 76. These values may be stored in memory 38, according to some embodiments, and may be used to calculate the unloaded weight ($W_U$) 108 in the unloaded condition of the dump body 18. The electronic controller 34 may also be programmed to detect, or may receive an indication of, the loaded condition of the dump body 18 and, in response, may calculate the loaded front strut friction force ($F_{FL}$) 116 and the loaded rear strut friction force ($F_{RL}$) 118. These values may be used to calculate the loaded weight ($W_L$) 136, which is then used, along with the unloaded weight ($W_U$) 108 to calculate the payload material weight ($W_{PM}$) 142.

Figure 4:
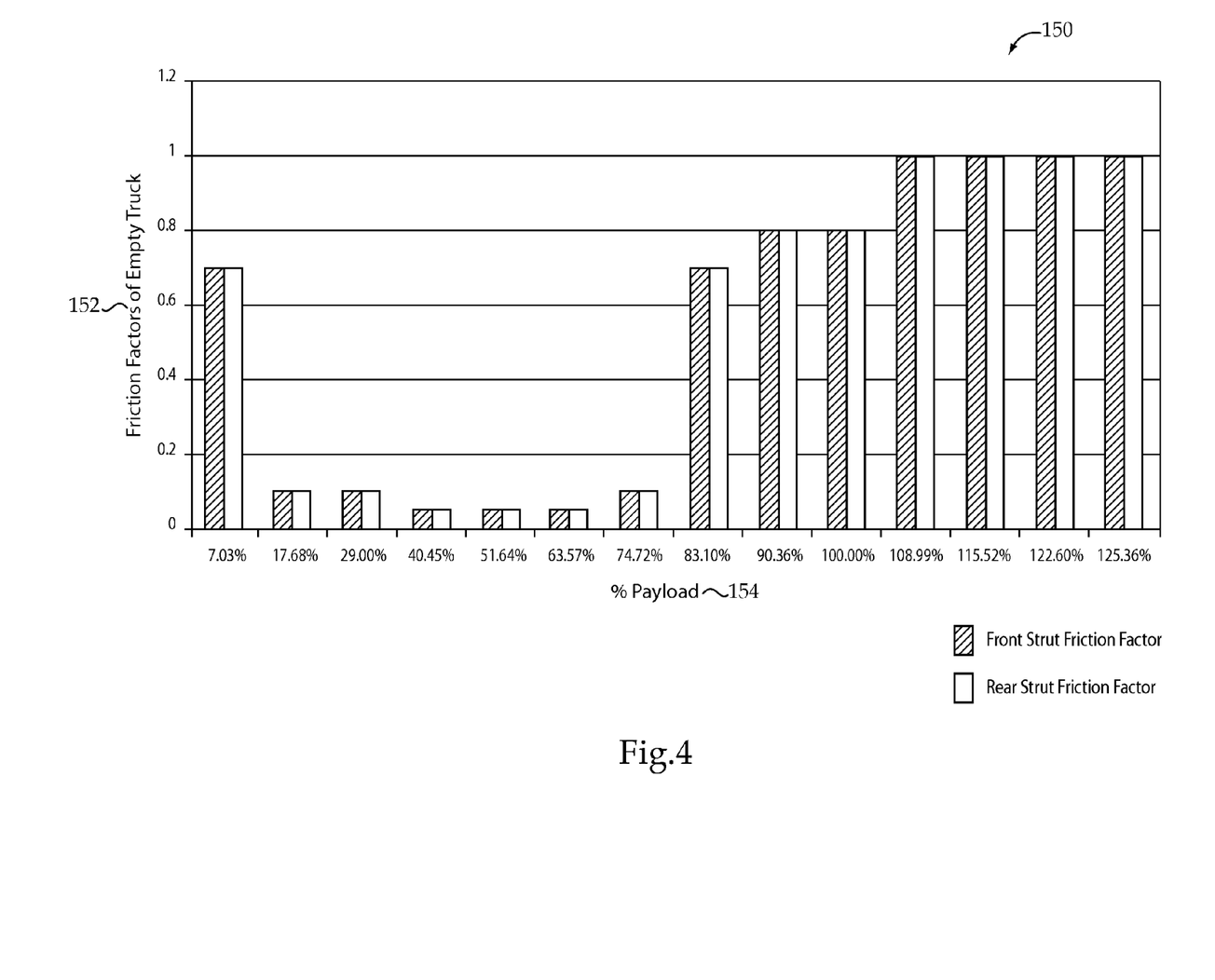
FIG. 4 is an exemplary friction factor map relating friction factor values to percentage payload values.

Turning now to FIG. 4, an exemplary friction factor map 150, which may be stored in memory 38, is shown. In particular, FIG. 4 illustrates a map 150 of friction factor values 152, shown on the vertical axis, versus percentage payload values 154, shown on the horizontal axis. Depicted on the map 150 are exemplary friction factor values 152, which may be selected for use as the front strut friction factor ($KF_F$) 96 and the rear strut friction factor ($KF_R$) 98. In particular, a percentage payload value 154 corresponding to the machine 10 may be determined and the friction factor values 152 corresponding to the percentage payload value 154 may be selected for use as the front strut friction factor ($KF_F$) 96 and the rear strut friction factor ($KF_R$) 98. According to one example, the percentage payload value 154 may represent an average strut pressure over time for all of the struts 26, 28, 30, and 32.

The front strut friction factor ($KF_F$) 96 and the rear strut friction factor ($KF_R$) 98, along with the front strut coefficient of friction ($KC_F$) 92 and the rear strut coefficient of friction ($KC_R$) 94, may be tunable. For example, values for each of the front strut friction factor ($KF_F$) 96, the rear strut friction factor ($KF_R$) 98, the front strut coefficient of friction ($KC_F$) 92, and the rear strut coefficient of friction ($KC_R$) 94 may be selected and used to calculate payload material weight, as disclosed herein. The calculated payload material weight may be verified with test data and, thereafter, each of the front strut friction factor ($KF_F$) 96, the rear strut friction factor ($KF_R$) 98, the front strut coefficient of friction ($KC_F$) 92, and the rear strut coefficient of friction ($KC_R$) 94 may be tuned to match the test data.

Industrial Applicability

The present disclosure may be applicable to machine systems and methods for calculating payload material weight. In particular, the present disclosure is applicable to machines including at least a first front strut and a first rear strut positioned to support a dump body of the machine relative to the machine frame. An exemplary machine may include a dump truck having a dump body movable between a hauling position and a dumping position.

Referring generally to FIGS. 1-4, an exemplary machine 10 includes a machine frame 12 supported by a conveyance 14. A dump body 18 may be pivotally mounted on the machine frame 12 such that the dump body 18 is movable between a hauling position, as shown, and a dumping position, shown in phantom. The dump body 18 may have a loaded condition in which the dump body 18 supports a payload material 20 and an unloaded condition in which the dump body 18 is substantially free of the payload material 20. The machine 10 may also include an operator control station 22 supported on the machine frame 12 and housing various controls and devices, including an operator display 24, for controlling operation of the machine 10. According to one embodiment, the operator display 24, which may be interactive, may facilitate the calculation and/or display of payload material weight information. The machine 10 also includes at least a first front strut 26 and a first rear strut 30 positioned to support the dump body 18 relative to the machine frame 12. According to the exemplary embodiment, the machine 10 includes first and second front struts 26 and 28 and first and second rear struts 30 and 32.

At least one electronic controller 34 of the machine 10 may be in communication with the first and second front struts 26 and 28 and the first and second rear struts 30 and 32. In particular, the electronic controller 34 may be in communication with pressure sensor devices configured to detect pressures of each of the struts 26, 28, 30, and 32. Pressures ($P_{LFU}$) 78, ($P_{RFU}$) 80, ($P_{LRU}$) 82, and ($P_{RRU}$) 84 may be detected in the unloaded condition of the dump body 18 to calculate an unloaded front strut friction force ($F_{FU}$) 74 and an unloaded rear strut friction force ($F_{RU}$) 76, and also to calculate an unloaded weight ($W_U$) 108. Pressures ($P_{LFL}$) 120, ($P_{RFL}$) 122, ($P_{LRL}$) 124, and ($P_{RRL}$) 126 may be detected in the loaded condition of the dump body 18 to calculate a loaded front strut friction force ($F_{FL}$) 116 and a loaded rear strut friction force ($F_{RL}$) 118, and also a loaded weight ($W_L$) 136.

In particular, and according to the payload material weight calculation algorithm described herein, the electronic controller 34 may be configured to calculate the unloaded front strut friction force ($F_{FU}$) 74 by combining the detected pressures ($P_{LFU}$) 78 and ($P_{RFU}$) 80 of the first and second front struts 26 and 28 in the unloaded condition and multiplying the result by a front strut area ($A_F$) 86, which may define a third force 102 and may be stored in memory 38. The third force 102 is then multiplied by a front strut coefficient of friction ($KC_F$) 92 and a front strut friction factor ($KF_F$) 96, both of which are tunable and stored in memory 38. The unloaded rear strut friction force ($F_{RU}$) 76 may be calculated, using the electronic controller 34, by combining the detected pressures ($P_{LRU}$) 82, and ($P_{RRU}$) 84 of the first and second rear struts 30 and 32 in the unloaded condition and multiplying the result by a rear strut area ($A_R$) 88, which may define a fourth force 106 and may be stored in memory 38. The fourth force 106 may be multiplied by a rear strut coefficient of friction ($KC_R$) 94 and a rear strut friction factor ($KF_R$) 98, which may also be tunable and stored in memory 38. The unloaded weight ($W_U$) 108 may be calculated, by the electronic controller 34, by first adding the third force 102 and the fourth force 106 to arrive at a first force 112. The first force 112 is then adjusted based on both of the unloaded front strut friction force ($F_{FU}$) 74 and the unloaded rear strut friction force ($F_{RU}$) 76 to ultimately define the unloaded weight ($W_U$) 108.

The electronic controller 34 may also be configured to calculate the loaded front strut friction force ($F_{FL}$) 116 by combining the detected pressures ($P_{LFL}$) 120 and ($P_{RFL}$) 122 of the first and second front struts 26 and 28 in the loaded condition and multiplying the result by the front strut area ($A_F$) 86, which may define a fifth force 130. The fifth force 130 is then multiplied by the front strut coefficient of friction ($KC_F$) 92. The loaded rear strut friction force ($F_{RL}$) 118 may be calculated, using the electronic controller 34, by combining the detected pressures ($P_{LRL}$) 124 and ($P_{RRL}$) 126 of the first and second rear struts 30 and 32 in the loaded condition and multiplying the result by the rear strut area ($A_R$) 88 to define a sixth force 134. The sixth force 134 is multiplied by the rear strut coefficient of friction ($KC_R$) 94. The loaded weight ($W_L$) 136 may be calculated, by the electronic controller 34, by first adding the fifth force 130 and the sixth force 134 to arrive at a second force 140. The second force 140 is then adjusted based on both of the loaded front strut friction force ($F_{FL}$) 116 and the loaded rear strut friction force ($F_{RL}$) 118 to ultimately define the loaded weight ($W_L$) 136.

The electronic controller 34 may also be configured to calculate a payload material weight ($W_{PM}$) 142 based on a difference between the loaded weight ($W_L$) 136 and the unloaded weight ($W_U$) 108, which are calculated as described above. Thus, the electronic controller 34 uses detected strut pressures ($P_{LFU}$) 78, ($P_{RFU}$) 80, ($P_{LRU}$) 82, and ($P_{RRU}$) 84 in the unloaded condition, detected strut pressures ($P_{LFL}$) 120, ($P_{RFL}$) 122, ($P_{LRL}$) 124, and ($P_{RRL}$) 126 in the loaded condition, and tunable parameters, including the front strut friction factor ($KF_F$) 96, the rear strut friction factor ($KF_R$) 98, the front strut coefficient of friction ($KC_F$) 92 and the rear strut coefficient of friction ($KC_R$) 94, according to the equations provided herein to calculate the payload material weight ($W_{PM}$) 142. By using numerous tunable parameters, the disclosed payload material calculation algorithm may be able to achieve at least 5% payload weight accuracies for not only nominal payloads but also a wide range of payloads.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A machine having a payload material weight calculation algorithm executable thereon, comprising:
    a machine frame supported by a conveyance;
    a dump body pivotally mounted on the machine frame and having a loaded condition in which the dump body supports a payload material and an unloaded condition in which the dump body is substantially free of the payload material;
    a first front strut and a first rear strut positioned to support the dump body relative to the machine frame; and
    an electronic controller in communication with the first front strut and the first rear strut and configured to:
        determine a first force on the first front strut and the first rear strut in the unloaded condition,
        adjust the first force based on at least one of an unloaded front strut friction force corresponding to the unloaded condition and an unloaded rear strut friction force corresponding to the unloaded condition to define an unloaded weight,
        determine a second force on the first front strut and the first rear strut in the loaded condition,
        adjust the second force based on at least one of a loaded front strut friction force corresponding to the loaded condition and a loaded rear strut friction force corresponding to the loaded condition to define a loaded weight, and
        determine a weight of the payload material based on a difference between the loaded weight and the unloaded weight.

2. The machine of claim 1, further including a second front strut and a second rear strut positioned to support the dump body relative to the machine frame.

3. The machine of claim 2, wherein the first force is a combination of:
    a combined unloaded front strut pressure of the first and second front struts in the unloaded condition multiplied by a front strut area of one of the first and second front struts; and
    a combined unloaded rear strut pressure of the first and second rear struts in unloaded condition multiplied by a rear strut area of one of the first and second rear struts.

4. The machine of claim 3, wherein the second force is combination of:
    a combined loaded front strut pressure of the first and second front struts in the loaded condition multiplied by the front strut area; and
    a combined loaded rear strut pressure of the first and second rear struts in the loaded condition multiplied by the rear strut area.

5. The machine of claim 4, wherein the first force is adjusted based on both of the unloaded front strut friction force and the unloaded rear strut friction force, and the second force is adjusted based on both of the loaded front strut friction force and the loaded rear strut friction force.

6. The machine of claim 5, wherein each of the unloaded front strut friction force, the unloaded rear strut friction force, the loaded front strut friction force, and the loaded rear strut friction force is multiplied by 2.

7. The machine of claim 5, wherein the loaded front strut friction force is the combined loaded front strut pressure multiplied by the front strut area and a front strut coefficient of friction corresponding to a first friction between surfaces of at least one of the first and second front struts, and the loaded rear strut friction force is the combined loaded rear strut pressure multiplied by the rear strut area and a rear strut coefficient of friction corresponding to a second friction between surfaces of at least one of the first and second rear struts.

8. The machine of claim 7, wherein the unloaded front strut friction force is the combined unloaded front strut pressure multiplied by the front strut area and the front strut coefficient of friction, and the unloaded rear strut friction force is the combined unloaded rear strut pressure multiplied by the rear strut area and the rear strut coefficient of friction.

9. The machine of claim 8, wherein each of the front strut coefficient of friction and the rear strut coefficient of friction is stored in a memory of the machine.

10. The machine of claim 8, wherein the unloaded front strut friction force is adjusted by a front strut friction factor and the unloaded rear strut friction force is adjusted by a rear strut friction factor, wherein the front strut friction factor and the rear strut friction factor are determined from percentage payload values of the machine.

11. The machine of claim 10, wherein each of the front strut friction factor and the rear strut friction factor is stored in a friction factor map, wherein the friction factor map is stored in the memory and includes mappings of friction factor values to the percentage payload values.

12. A method of calculating a payload material weight for a machine, the machine including a machine frame supported by a conveyance, a dump body pivotally mounted on the machine frame and having a loaded condition in which the dump body supports a payload material and an unloaded condition in which the dump body is substantially free of the payload material, a first front strut and a first rear strut positioned to support the dump body relative to the machine frame, and an electronic controller in communication with the first front strut and the first rear strut, the method comprising steps of:
    determining a first force on the first front strut and the first rear strut in the unloaded condition using the electronic controller;
    adjusting the first force based on at least one of an unloaded front strut friction force corresponding to the unloaded condition and an unloaded rear strut friction force corresponding to the unloaded condition using the electronic controller to define an unloaded weight;
    determining a second force on the first front strut and the first rear strut in the loaded condition using the electronic controller;
    adjusting the second force based on at least one of a loaded front strut friction force corresponding to the loaded condition and a loaded rear strut friction force corresponding to the loaded condition using the electronic controller to define a loaded weight; and
    determining a weight of the payload material based on a difference between the loaded weight and the unloaded weight.

13. The method of claim 12, further including storing a front strut coefficient of friction and a rear strut coefficient of friction in a memory of the machine,
- wherein the front strut coefficient of friction corresponds to a first friction between surfaces of at least one of the first and second front struts; and
- wherein the rear strut coefficient of friction corresponds to a second friction between surfaces of at least one of the first and second rear struts.

14. The method of claim 13, further including storing a front strut friction factor and a rear strut friction factor in a friction factor map, wherein the friction factor map is stored in the memory and includes mappings of friction factor values to percentage payload values of the machine.

15. The method of claim 14, wherein the step of determining the first force includes:
- determining a third force on the first front strut and a second front strut in the unloaded condition;
- determining a fourth force on the first rear strut and a second rear strut in the unloaded condition; and
- combining the third and fourth forces.

16. The method of claim 15, wherein:
- the step of determining the third force includes combining a detected pressure of each of the first and second front struts in the unloaded condition to define a combined unloaded front strut pressure and multiplying the combined unloaded front strut pressure by a front strut area of one of the first and second front struts; and
- the step of determining the fourth force includes combining a detected pressure of each of the first and second rear struts in the unloaded condition to define a combined unloaded rear strut pressure and multiplying the combined unloaded rear strut pressure by a rear strut area of one of the first and second rear struts.

17. The method of claim 16, wherein the step of determining the second force includes:
- determining a fifth force on the first and second front struts in the loaded condition;
- determining a sixth force on the first and second rear struts in the loaded condition; and
- combining the fifth and sixth forces.

18. The method of claim 17, wherein:
the step of determining the fifth force includes combining a detected pressure of each of the first and second front struts in the loaded condition to define a combined loaded front strut pressure and multiplying the combined loaded front strut pressure by the front strut area; and
the step of determining the sixth force includes combining a detected pressure of each of the first and second rear struts in the loaded condition to define a combined loaded rear strut pressure and multiplying the combined loaded rear strut pressure by the rear strut area.

19. The method of claim 18, further including:
- determining the unloaded front strut friction force by multiplying the third force by the front strut coefficient of friction;
- determining the unloaded rear strut friction force by multiplying the fourth force by the rear strut coefficient of friction;
- determining the loaded front strut friction force by multiplying the fifth force by the front strut coefficient of friction; and
- determining the loaded rear strut friction force by multiplying the sixth force by the rear strut coefficient of friction.

20. The method of claim 19, further including:
- adjusting the unloaded front strut friction force by the front strut friction factor; and
- adjusting the unloaded rear strut friction force by the rear strut friction factor.

* * * * *